(No Model.)
G. H. BARRUS.
STEAM CALORIMETER.
No. 392,980. Patented Nov. 20, 1888.
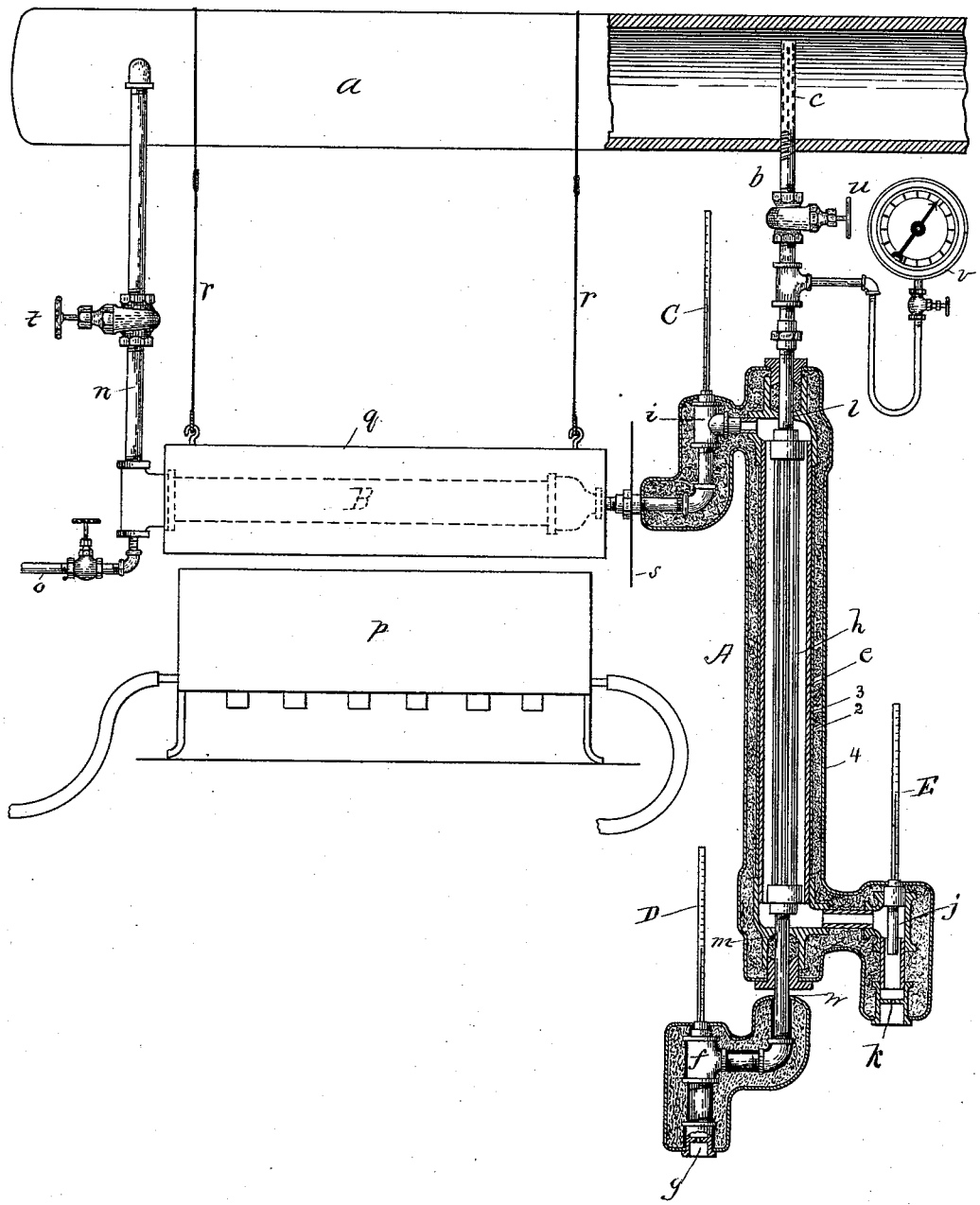
WITNESSES.
H. Brown.
A. D. Harrison.
INVENTOR.
Geo. H. Barrus,
By Wright, Brown & Crossley,
attys.

ature approximately 18.7° Fahrenheit. This is the exact quantity for eighty pounds' pressure. For other pressures the quantity is obtained by dividing one per cent. of the latent heat by 0.475, which is the specific heat of superheated steam. In proportion, then, as the fall of temperature is greater or less than this number of degrees the amount of moisture sought for is greater or less than one per cent. It is immaterial what the exact quantity of steam is which is tested, so long as the relation

UNITED STATES PATENT OFFICE.

GEORGE H. BARRUS, OF READING, MASSACHUSETTS.

STEAM-CALORIMETER.

SPECIFICATION forming part of Letters Patent No. 392,980, dated November 20, 1888.

Application filed April 30, 1888. Serial No. 272,227. (No model.)

*To all whom it may concern:*

Be it known that I, GEORGE H. BARRUS, of Reading, in the county of Middlesex and State of Massachusetts, have invented certain new and useful Improvements in Steam-Calorimeters, of which the following is a specification.

My invention relates to the measurement of the quantity of moisture in steam, and has for its object the determination of this quantity with much less trouble, and, what is far more important, with fewer possibilities of error, than has been done with the calorimeters heretofore in use.

The calorimeters ordinarily used for measuring the dryness of steam operate in an indirect manner. They first determine how much heat is contained in the sample tested. The condition of the steam with respect to dryness is then shown by comparison of the result with the quantity of heat given by the authorities for dry saturated steam. The sample contains moisture in proportion as the result is less than the authorized standard. It contains what is termed "superheat" in proportion as the result is greater than the standard.

Suppose the steam has a pressure of eighty pounds per square inch above the atmosphere. The total heat given in Regnault's steam-tables for this pressure is 1212.6 B. t. u. above 0 Fahrenheit. If the calorimeter test yields, for example, 1190 B. t. u., it falls short of the standard 22.6 B. t. u., which is an indication that the steam contains $\frac{22.6}{885.7}=2.5$ per cent. of moisture, 885.7 being the latent heat of the steam. If the test yields, say, 1225 B. t. u., it gives an excess over the standard of 12.4 B. t. u., which is an indication that the steam is superheated $\frac{12.4}{.475}=26.1°$. Calorimeters which work on this principle do not give accurate indications of the amount of moisture in steam unless thermometers and scales are employed which are sensitive and which register minute changes, and unless extreme care is used in the manipulation of the apparatus. In the case of the barrel calorimeter, the one commonly used, supposing the range of temperature to be 50° Fahrenheit, and the weight of steam used for a test twenty pounds, an error of half a degree in the observations of the thermometers, or an error of one-fifth of a pound in the observations of the weight of water in the barrel, causes an error of one per cent. in the result. A larger error than this might ensue if the observation of each extreme were erroneous and all the errors acted in the same final direction. Unusually close work is more important than would first appear, for the reason that the moisture in steam of ordinary dryness does not often exceed three per cent., and a small error becomes large by comparison. Calorimeters of the continuous type are more accurate in this respect, for they deal with larger quantities of steam and water and a greater number of observations for a given test; but they require equally careful manipulation.

The new form of calorimeters comprising the subject-matter of the present application so far reduces the errors referred to that they become almost inappreciable, and it greatly simplifies the operation of making an accurate test. In order to use it, it is simply necessary to observe thermometers which show many degrees change of temperature for a change of one per cent. of moisture. It should be said at the outset that it is intended to be used only for testing moist steam.

Unlike the calorimeters referred to, the present apparatus operates directly upon the moisture contained in the sample of steam tested. It evaporates the moisture and determines its amount by measuring the amount of heat required for this purpose. The evaporating agent is a current of superheated steam, and it is the superheat of that steam which is utilized to do the work. The determination of the amount of superheat required constitutes the immediate object in view, and this is attained by observing the temperature of the superheated steam before and after its use. When the quantity of superheated steam equals that of the sample tested, the evaporation of one per cent. of moisture reduces the temperature approximately 18.7° Fahrenheit. This is the exact quantity for eighty pounds' pressure. For other pressures the quantity is obtained by dividing one per cent. of the latent heat by 0.475, which is the specific heat of superheated steam. In proportion, then, as the fall of temperature is greater or less than this number of degrees the amount of moisture sought for is greater or less than one per cent. It is immaterial what the exact quantity of steam is which is tested, so long as the relation borne to the current of superheated steam remains constant. Weighing is therefore dispensed with altogether, and the desired relation between the quantities is maintained by causing each current of steam to pass through an orifice of fixed size. To obtain equal quantities, which is the relation most to be desired, the two orifices are made of practically the same size, and the steam is admitted upon them with a pressure common to both.

My invention consists in the device hereinafter fully described, and pointed out in the claim appended to this specification.

For a clear understanding of the invention reference is made to the accompanying drawing and the letters of reference marked thereon, forming a part of this specification, which drawing represents a side elevation and partial section of the device comprising my invention.

In the drawing, $a$ designates the main steam-pipe or source from which the steam to be tested is taken.

$b$ designates a pipe for supplying the calorimeter with a sample of the steam to be tested, usually a half-inch iron pipe, which pipe $b$ is connected with the main pipe $a$ and the calorimeter proper, and in order that it may receive a sample of the whole current of steam in the main pipe $a$, said pipe $b$ is preferably extended into the main pipe $a$ and through or nearly through from side to side of the interior of the same, as shown. The sides of that portion of pipe $b$ extending into pipe $a$ are provided with numerous holes, $c$, and the end $d$ is sealed or closed. Care is taken that none of the holes $c$ are formed at such point as to allow free water which may chance to be in pipe $a$ to enter pipe $b$.

A designates the calorimeter proper, consisting mainly of one or more heating-tubes, $h$, and the surrounding annular jacket-space $e$. The heating-tubes $h$ communicate at one end with the supply-pipe $b$ and at the other end with the thermometer-chamber $f$, the bottom of which contains a central orifice, $g$, about one-eighth of an inch in diameter, for the escape of steam. The annular jacket-space $e$ communicates at one end with a thermometer-chamber, $i$, and at the other end with a thermometer-chamber, $j$. This chamber, like the chamber $f$, has a discharge-orifice, $k$, about one-eighth inch in diameter. The chamber $i$ communicates with and is supplied from a superheating-pipe, B, which in turn is supplied from the main pipe $a$ through the pipe $n$. A lamp, $p$, or other suitable heater, is placed below the superheating-pipe B for maintaining the super-heat required to operate the calorimeter.

C designates a thermometer, resting in an oil-cup placed in the chamber $i$, and this is used for indicating the amount of superheat which enters the annular jacket-space $e$.

E designates a thermometer, likewise placed in the chamber $j$, and this indicates the amount of superheat which leaves the jacket-space.

D designates a thermometer likewise placed in the chamber $f$, which indicates the amount of superheat in the sample of steam tested on leaving the apparatus.

No communication is provided between the interior of the heating-tubes $h$ and the annular space surrounding them. The openings $l$ and $m$ at the ends of this space where the supply-pipe $b$ enters and the discharge-pipe $w$ leaves the jacket consist of stuffing-boxes packed with asbestus-wick packing or other suitable material.

The exterior of the colorimeter proper, A, and the thermometer-chambers is protected against heat radiation by means of any suitable covering, (herein represented as consisting of an inner layer of asbestus board 2, a thick layer of hair felting, 3, and an outer covering or finish of duck, 4.) It is advisable also to to cover the supply-pipe $b$ from the main pipe $a$ to the calorimeter proper, though not thus shown here.

The superheating-pipe B is shielded above by a hood, $q$, consisting of sheet iron lined with asbestus board, which is hung or supported in a suitable manner two or three inches above the superheater, and this serves to economize the heat of the lamp. A piece of asbestus board, $s$, is arranged to protect the covering of the calorimeter from the heat of the lamp.

A drip, $o$, is provided to free the steam entering the superheater from water. The steam-gage $v$ is provided to indicate the pressure in the calorimeter. The discharge-orifices are so arranged that pipes may be attached below them and the steam which passes through carried, if desired, to condensers. This may be required when the orifices are made, either intentionally or accidentally, of different sizes where its quantity may be measured. For ordinary use the orifices are of the same size and the steam which passes through blows into the room where the calorimeter is located.

In the use of my invention steam will first be admitted to the calorimeter through the pipes $b$ and $n$ by opening the valves $t$ and $u$, the steam escaping through the orifices $g$ and $k$. When under full steam-pressure, the thermometers C E D will furnish the normal readings from which to compute the amount of superheating in the various cases. The superheating-lamp $p$ will then be started or lighted, and the steam from the superheater B, passing to the annular chamber $e$, is gradually superheated to such a degree that the thermometer D begins to rise above the normal point, which rise in thermometer D will take place only at the moment when the sample-steam in the heating-tubes $h$ is dried or freed from moisture. The difference in the amount of superheat shown by the two thermometers C and E is observed at this time, and that difference measures the heat expended in drying the moisture in the heating-tubes and in radiation from the exterior of the calorimeter. If the heat expended in radiation be deducted, (being determined by observing the difference in the two thermometers when steam is shut off from the heating-tubes,) the quantity remaining divided by the latent heat of the steam multiplied by 47.5 gives the percentage of moisture in the steam, which is the desired result.

The operation of my invention may be better understood by an illustration from actual use. The superheated steam entering the jacket contained 99° superheat; that leaving the jacket 54.5° superheat. The difference—that is, the superheat expended in the calorimeter on the heating-tubes and in radiation—is therefore 99−54.5=44.5°. The moisture was all dried out of the steam tested and an additional 8° of superheat supplied to it. The radiation from the exterior was also 8°. These two items make a total of 16° to be deducted from 44.5, leaving 28.5° superheat actually expended in evaporating the moisture. The pressure was eighty-nine pounds. At this pressure the latent heat is 881 B. t. u. Consequently the percentage of moisture is 28.5÷881×47.5=1.53 per cent. A small portion of this is due to the radiation from the supply-pipe $b$, and this must be allowed for when close work is desired. In brief, it may be said that the thermometer D shows when the moisture is all dried out of the steam, and at that time the thermometers C and E measure the quantity of moisture which has been evaporated.

It is obvious that changes may be made in the form and arrangement of parts of my invention without departing from the nature or spirit thereof.

I claim—

In a steam-calorimeter, the combination of the heating-tubes, the jacket surrounding the same, a steam-superheater supplying the jacket, thermometers for showing the heat absorbed by the moisture tested and for showing when the moisture is all evaporated, and orifices of suitable size and proportion to maintain the same or any desired relation between the quantity of heating steam and of steam tested.

In testimony whereof I have signed my name to this specification in the presence of two subscribing witnesses.

GEORGE H. BARRUS.

Witnesses:
 C. F. BROWN,
 A. D. HARRISON.